Oct. 8, 1963 T. R. DAVIS 3,106,286
TROUGHING ROLLER ASSEMBLIES
Filed Dec. 27, 1961
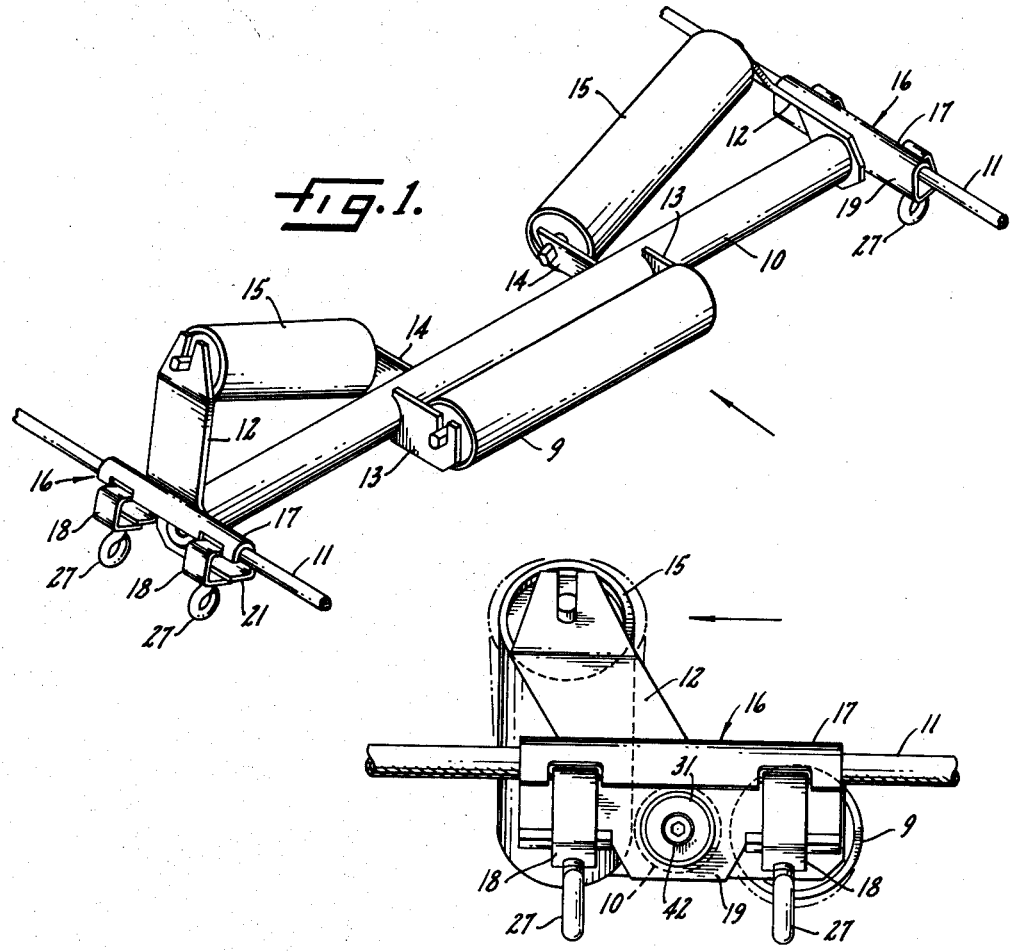
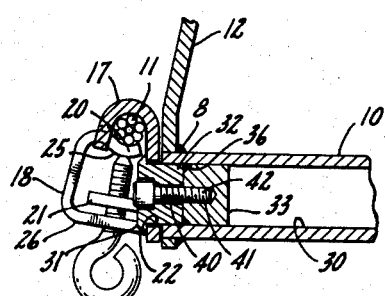
INVENTOR.
Thomas R. Davis,
BY Parker & Carter
Attorneys.

United States Patent Office 3,106,286
Patented Oct. 8, 1963

3,106,286
TROUGHING ROLLER ASSEMBLIES
Thomas R. Davis, McHenry, Ill., assignor to Goodman Manufacturing Company, Chicago, Ill., a corporation of Illinois
Filed Dec. 27, 1961, Ser. No. 162,400
7 Claims. (Cl. 198—192)

This invention relates to troughing idler assemblies, in particular, to a pivotal assembly responsive to impacts from overlying loads.

An object of this invention is to provide a pivotal troughing idler assembly for a wire rope side-frame conveyor.

Another object is to provide a troughing idler assembly which can be easily assembled and disassembled.

Another object is a troughing idler assembly designed to pivot over means extending from elongated connectors which suspend a troughing idler assembly.

Another object is to provide a pivotal troughing idler assembly wherein said assembly tilts downstream upon the impact of a longitudinal force.

Another object is a pivotal troughing idler assembly which will tilt upstream when the direction of the conveyor system is reversed.

Another object is a pivotal troughing idler assembly wherein the pivotal means are anchored to the inside of the crosspiece in said troughing idler assembly.

Another object is a pivotal troughing idler assembly wherein the pivotal means are seated in the wall of an elongated connector.

The foregoing objects and other objects which will become apparent from time to time are now realized by the invention which will be described in detail and which is illustrated in the attached drawings wherein:

FIGURE 1 is a perspective view of a troughing idler assembly,

FIGURE 2 is an end view of said assembly, and

FIGURE 3 is a partial side view taken in cross section.

The troughing idler assembly of this invention is suspended between generally parallel wire ropes. A series of such assemblies are spaced more or less regularly along the length of a wire rope sideframe conveyor which includes spaced upright stnadards to support the flexible side rope, a return roller positioned somewhere below the troughing idler assembly (also spaced along the length of a conveyor system), and an endless conveyor belt having a conveying reach riding on the idler assembly and a return reach carried by the return rollers. The upright standards, the return roller and the endless conveyor belt will not be described and are not illustrated because these and other components of the conveyor system do not form an essential portion of the invention.

The troughing idler assembly of FIGURE 1 has a crosspiece 10 which extends to elongated connectors generally shown as 16. The crosspiece has wing rollers 15, 15, which have their outer ends seated in slots in the upper end of supporting arms in brackets 12, 12 and their inner ends held by smaller brackets 14, 14. A center roller 9 is similarly held by brackets 13, 13. The conveying reach of the endless belt rides on such idler rollers.

The elongated connector 16 has a curved rope seat 17 and a clamp 18. The curved rope seat 17 is continuous with a wall 19 which has an inward flange 20 at the bottom of the wire ropes. The wall 19 has an annular passageway 22 which is best seen in cross section in FIGURE 3. An annular plug is seated in this passageway, as will be discussed later.

The clamp 18 has an upper curved portion 25 shaped to closely engage the underside of the wire rope 11. A lower flange 26 of the clamp receives a clamping screw 27 which is passed through passageways in the flange 26 and the flange 21 to press against the curved portion 25 and thereby tightly engage the elongated connector 16 with the wire rope 11.

The crosspiece 10 extends to and closely adjoins the wall 19 of each elongated connector. The crosspiece is hollow, at least at its ends, so as to form an annular bore 30 within the crosspiece, but the crosspiece is preferably a hollow tube throughout its length. The crosspiece is pivotally engaged to the side support frame by a first annular plug or pivotal plug 32 which is freely fixed to the elongated connector by a continuous flange 31. The pivotal plug 32 is not otherwise secured to any portion of the crosspiece but is joined to a second or anchoring plug 33. The anchoring plug is securely fixed within the annular bore of the crosspiece by welding, such as at 36, or by equivalent means. The first plug may be securely fixed to the elongated connector rather than freely fixed so long as said first plug is not secured to any portion of the crosspiece.

The first plug is seated in the annular passageway 22 in the wall 19 of the elongated connector 16. The continuous flange 31 coextensive with the first plug freely fixes said plug to the elongated connector. This flange rests against the wall 19 on the side opposite to the side which adjoins the end of the crosspiece 10. The first or pivotal plug is shown as having a central bore 40 which is common with a bore of smaller diameter 41 in the anchoring or second plug. A locating pin, such as shown at 42, is tightly engaged in the bore 41 of the second plug and is loosely engaged in the larger bore 40 in the first plug. The pin 41 locates the plugs in face-to-face relationship, and anchors the plugs to each other. The pivotal plug 32 is positioned within the annular bore 30 of the crosspiece so that it is independent of any motion of the crosspiece, the anchoring plug, and the locating pin 42.

The end view of FIGURE 2 is another way to view the relationship of the various parts in the assembly. The supporting arm 12 is more realistically shown as offset in a downstream direction, as indicated by the arrow. The upright supporting arm 12 is fixed at its lower portion to crosspiece 10 by welding or other means 8, as shown in FIGURE 3. The supporting arm 12 and the crosspiece 10 are seen to be free of the elongated connector 16. A pair of clamps 18, 18 are shown pressing against the underside of the wire rope 11. The wall 19 of the elongated connector and the curved wire rope seat 17 are shown in their engaging position. The locating pin 42, the pivotal plug 32 and the phantom outline of the crosspiece 10 are shown positioned in the wall 19 of the elongated connector.

The use and operation of my invention are as follows:

A troughing idler assembly in a wire rope sideframe conveyor is subject to various impact forces, among which is a longitudinal impact or an impact from an overlying load in its downstream conveyance. Repeated longitudinal or downstream impacts on a non-yielding troughing idler assembly may lead to serious damage or early breakdown of said assembly. The troughing idler assembly described and shown here is made to give or ride with an impact from an overlying load.

The troughing assembly is quickly assembled by placing a crosspiece which preferably is a tube 10 in between elongated connectors 16 which are engaged on generally parallel wire ropes. A pivotal plug is freely fixed in the annular passageway 22 of the wall 19 of the elongated connector, and said plug freely sits in the closely fitting annular bore 30 of the tube 10. The position of the pivotal plug is partially fixed by a continuous annular flange 31 on said first plug which rests against the side of the wall 19 opposite to the side which adjoins the crosspiece 10. A locating and anchoring pin 42 is inserted freely through a larger bore 40 in the first plug and is firmly and securely seated in the tightly fitting bore 41 in the anchoring or second plug. The clamp 18 of the elongated connector is then engaged and the screw 27 presses the curved portion 25 of the clamp tightly against the underside of the wire rope.

A heavy load carried by the conveying reach of the endless belt will strike the troughing idler assembly when said load rides over the rollers. The longitudinal impact from such load will tend to tilt the supporting arm 12 and the other brackets and rollers on the crosspiece. The crosspiece will give or ride with such an impact because the force behind the tilting motion will be transferred to a pivotal motion about the pivotal plug 32. The anchoring plug and the pin will tilt or pivot with the crosspiece but not the pivotal plug because the pin 42 is loosely seated in the bore 40 of said first plug.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. A pivotal troughing idler assembly for a wire rope sideframe conveyor which includes, in combination,
    elongated connectors,
    a crosspiece extending to the elongated connectors,
    a plurality of idler rollers associated with the crosspiece,
    an annular bore in each end of the crosspiece,
    a pivotal annular plug seated in each elongated connector, said plug loosely fitting the annular bore, and said plug held within the bore independently of the motion of the crosspiece,
    whereby a downstream impact on the assembly allows the crosspiece to pivot along its longitudinal axis about the annular plug.

2. A troughing idler assembly as in claim 1 further characterized by and including an annular passageway in the elongated connector wherein the pivotal plug is seated.

3. A troughing idler assembly as in claim 1 further characterized in that the elongated connector has a generally upright wall, an annular passageway is present in said wall, and the pivotal plug is seated within said annular passageway and freely fixed therein by an annular flange extending from the plug on the side of the wall opposite the side to which the crosspiece extends.

4. The troughing idler assembly as in claim 1 wherein the annular bore within the crosspiece contains an anchoring plug fixed within the crosspiece and the pivotal plug adjoins said anchoring plug and is joined thereto independently of the motion of the crosspiece.

5. A pivotal troughing idler assembly for a wire rope sideframe conveyor which includes, in combination,
    elongated connectors engaging generally parallel wire ropes,
    a tube extending to the elongated connectors,
    a plurality of idler rollers associated with said tube,
    a pivotal plug freely fixed to each elongated connector, said plug loosely fitting within the end of the tube independently of any motion of the tube,
    whereby a downstream impact on the assembly allows the tube to pivot along its longitudinal axis about the pivotal plug.

6. A pivotal troughing idler assembly for a wire rope sideframe conveyor which includes, in combination,
    elongated connectors engaging generally parallel wire ropes,
    a tube extending to both elongated connectors,
    each connector having a generally upright wall, an annular passageway in said wall, a pivotal plug seated within said annular passageway and secured therein by a flange extending from the pivotal plug on the side of the wall opposite the side to which the tube extends, said pivotal plug loosely fitting within the end of the tube,
    an anchoring plug fixed within the tube,
    the pivotal plug joined to the anchoring plug by a locating pin imbedded in the anchoring plug but rotating freely within the pivotal plug,
    whereby the tube can pivot along its longitudinal axis and about the pivotal plug when a downstream impact contacts the assembly.

7. A pivotal troughing idler assembly for a wire rope sideframe conveyor which includes, in combination,
    elongated connectors engaging generally parallel wire ropes,
    a crosspiece extending to the elongated connectors,
    a plurality of idler rollers associated with said crosspiece,
    and pivotal means joining each connector to an end of the crosspiece so that a downstream impact on the assembly allows the crosspiece to pivot along its longitudinal axis around the pivotal means.

No references cited.